United States Patent [19]
Kita et al.

[11] Patent Number: 5,591,687
[45] Date of Patent: Jan. 7, 1997

[54] SILICON NITRIDE BASED SINTERED PRODUCT

[75] Inventors: Hideki Kita; Wenjea J. Tseng; Toshiyuki Yamada, all of Kanagawa, Japan

[73] Assignee: Isuzu Ceramics Research Insitute Co., Ltd., Japan

[21] Appl. No.: 384,981

[22] Filed: Feb. 7, 1995

[30] Foreign Application Priority Data

Feb. 7, 1994 [JP] Japan .................................. 6-033288
Aug. 2, 1994 [JP] Japan .................................. 6-200079

[51] Int. Cl.$^6$ .................................................. C04B 35/584
[52] U.S. Cl. ............................................ 501/97; 501/98
[58] Field of Search ........................................ 501/97, 98

[56] References Cited

U.S. PATENT DOCUMENTS

| 4,900,700 | 5/1988 | Jun et al. .................................. 501/96 X |
| 5,098,872 | 3/1992 | Suyama et al. ............................ 501/97 |
| 5,173,458 | 12/1992 | Nishioka et al. .......................... 501/97 |
| 5,387,562 | 2/1995 | Pillinger et al. ........................... 501/97 |

*Primary Examiner*—Karl Group
*Attorney, Agent, or Firm*—John E. Toupal; Harold G. Jarcho

[57] ABSTRACT

A silicon nitride based sintered product produced with Si powder, a $Si_3N_4$ powder, and an assistant component effective for sintering silicon nitride as raw materials. A resultant sintered product has fine tissue, exhibits little presence of pores and remaining silicon, and possesses high mechanical strength which can be enhanced by calcinating the product under low pressure after it has been reacted and first sintered.

8 Claims, 3 Drawing Sheets

SILICON NITRIDE BASED SINTERED PRODUCT CONTAINIG 0.02wt% OF Si

SILICON NITRIDE BASED SINTERED PRODUCT

BACKGROUND OF THE INVENTION

The present invention relates generally to a silicon nitride based sintered product and a method of producing the same making use of reactive sintering and, more particularly, to such a sintered product having fine or minute tissue and high mechanical strength.

As disclosed in Japanese Patent Application Laid Open No. 14635/1981, a method of producing a high-density silicon nitride based sintered product comprises: obtaining a calcinated product by adding to a Si (silicon) powder at least one powder of metal or oxides thereof selected out of Fe (iron), Co (cobolt), Ni (nickel), Mn (manganese), W (tungsten), Mo (molybdenum), Ti (titanium), Al (aluminum), Mg (magnesium) and Zr (zirconium); calcinating the product under an atmosphere of nitrogen at a temperature of 1300° to 1500° C.; dipping the calcinated product into a solution containing the metal, and again sintering the product while supplying a silicon-contained vapor at a temperature of 1350° to 1550° C.

When the molded product is being sintered by the aforementioned method, the added metal or the oxides thereof assume liquid or/and gaseous phase producing pores, inflations, cracks or the like within the final sintered product. Thus, the product is not suitable for high-temperature sintering, particularly, for thick-wall products.

In Japanese Patent Application Laid-Open No. 127266/1985, there is disclosed a method of producing a silicon nitride based sintered product which comprises preparing a molded product from a mixture of Si (silicon) powder and $SrZrO_3$ (strontium zirconate) powder or powder of precursor thereof, nitriding the molded product, and thereafter heating it at a temperature of 1600° C. or more. During the aforementioned method, the strontium zirconate becomes decomposed and reacts with $Si_3N_4$ (silicon nitride) converted from silicon to produce also pores, inflations, cracks or the like within the final sintered product. Therefore, this method is not suitable for calcination of thick-wall products.

Another method of producing a silicon nitride based sintered product is disclosed in Japanese Patent Application Laid-Open No. 89462/1988 and includes the steps of preparing a raw material mixed powder by adding to and mixing with a silicon powder an oxide of at least one kind of element selected from a group consisting of Periodic Table, Group IIA, Group IIIA, Zr (zirconium) and Al (aluminum) and/or an oxide precursor; processing a molded product formed from the mixed powder at a temperature of from 1000° to 1500° C. under an atmosphere of nitrogen at 10 atmospheric pressure or more; and then further processing the molded product at a temperature of from 1600° to 2200° C. under an atmosphere of nitrogen at 1 atmospheric pressure or more.

A product disclosed in Japanese Patent Application Laid-Open No. 114169/1988 comprises a base portion of the ceramic reacted sintered material and a surface layer in which pores are impregnated with oxide sintering assistants or sintering aids. Also, a method of producing a silicon nitride based sintered product disclosed in Japanese Patent Application Laid-Open No. 52678/1989 includes the steps of molding a product from a mixed powder comprising essentially 40 to 80 wt. % of a silicon nitride powder, 20 to 45 wt. % of a silicon powder, and 0.5 to 15 wt. % of a compound of elements in Periodic Table Group IIIA; calcinating the molded product at a temperature of from 1150° to 1400° C. under an atmosphere of nitrogen pressed at 2 to 10 atmospheric pressure to form the silicon into nitride; and thereafter re-calcinating the product under an atmosphere of nitrogen at a temperature of from 1700° to 2100° C. to provide higher density.

Also know is a method of producing a silicon nitride product in which Si, $Al_2O_3$ (alumina), and $Y_2O_3$ (yttrium oxide) are used as main raw materials. An extremely fine amount of Fe (iron) is added to the main raw materials, which are reacted and sintered, after which calcination under low pressure is employed to produce a tissue of the silicon nitride having a degree of 96 wt. % of relative density. However, high strength is not provided by a silicon nitride based sintered product with a 96 wt. % of relative density.

Silicon nitride prepared by reacting and sintering a Si powder as in prior art has a grain dimension of the order of a few μm. In addition, an expensive Si powder having a high purity of Si is present used. The resultant conventional silicon nitride based sintered materials do not exhibit high bending strength and high thermal expansion desired for products such as a piston pin of an internal combustion engine.

The object of this invention, therefore, is to provide an improved low cost silicon nitride product with high stength.

SUMMARY OF THE INVENTION

The invention is a silicon nitride based sintered product produced with Si powder, a $Si_3N_4$ powder, and an assistant component effective for sintering silicon nitride as raw materials. A resultant sintered product has fine tissue, exhibits little presence of pores and remaining silicon, and possesses high mechanical strength which can be enhanced by calcinating the product under low pressure after it has been reacted and first sintered.

Because of the reactive sintering, and the shrinkage caused by calcination, the finished product is less deformed, the near-net properties (the mechanical properties are not sensitively changed due to the fine difference in the composition ratio) are excellent, and the product cost is reduced.

According to one feature of the invention, $Y_2O_3$ and $Al_2O_3$ are used as a sintering aid or assistant, and the rate of the assistant relative to the total weight is 6.5 to 12.0 wt. %. This feature improves relative density to provide a silicon nitride based sintered product having high strength.

According to another feature of the invention, the sintered product contains 0.005 to 15 wt. % of Fe compound grains having a grain size of at least 0.2 μm occupying between 0.1 and 15% of a 200 μm×200 μm two-dimensional area of the product and also occupies 35% or less of 400 cell areas (10 μm×10 μm) obtained by equally longitudinally and laterally dividing the 200 μm×200 μm area into 20. This feature allows sintereing of a high strength product with inexpensive silicon powder and an amount of Fe which is generally considered an impurity.

According to yet another feature of the invention, ZnO (zinc oxide) is added to the raw material of the molded product to increase the amount of α phase silicon nitride produced when the silicon is converted into silicon nitride. This feature increases the strength of the silicon nitride based sintered product.

According to still another feature of the invention, AlN (aluminum nitride) is added to the product to thereby change the structure of a grain boundary phase and also the chemical composition. As a result, the tissue of the produce is improved.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

FIRST EMBODIMENT

Figure 1:
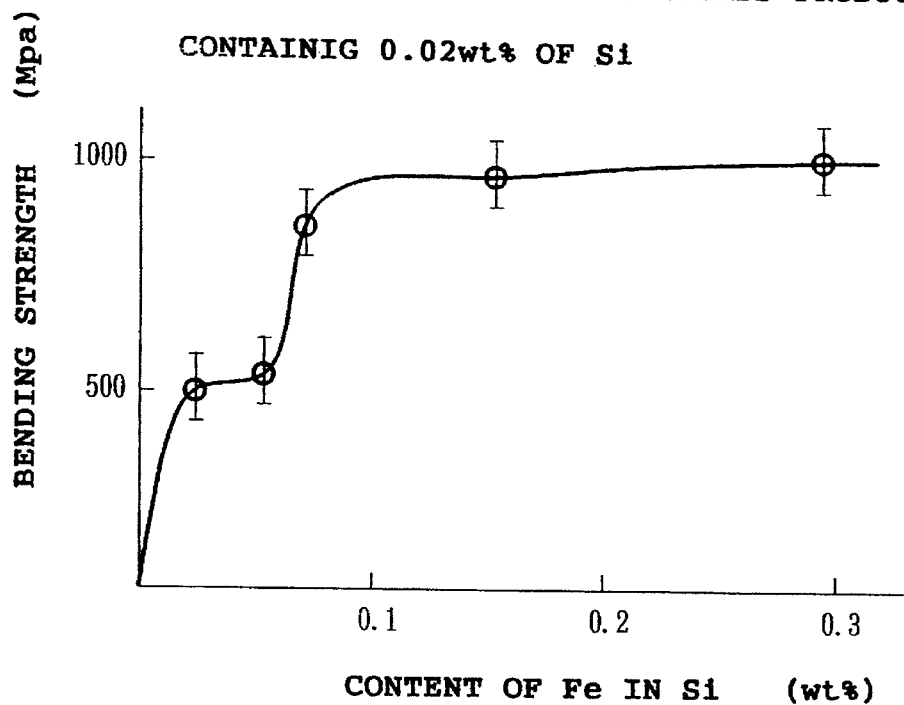
FIG. 1 is a diagram showing a relationship between amount of Fe additive and bending strength for a silicon nitride based sintered product according to the present invention.

One embodiment of the invention is a silicon nitride based sintered product comprising compositions containing at least the elements of Si (silicon), N (nitrogen), Al (aluminum), O (oxygen) and Y (yttrium). The elements are contained in the compositions Si, $Si_3N_4$, $Al_2O_3$ and $Y_2O_3$ having weights, respectively, of a, b, c and d, which satisfy the expression:

$$6.5 \leq 100(c+d)/(1.38a+b+c+d) \leq 12.0 \quad (1)$$

and for which d/c is 1 or more. Mixed powders of the compositions are sintered to prepare the product which in addition to the elements of Si, N, Al, O and Y, contains another element having an amount of 1 wt. % or more in oxide.

A method of producing the above described silicon nitride based sintered product includes the steps of preparing a molded product from mixed powders of the compositions Si, $Si_3N_4$, $Al_2O_3$ and $Y_2O_3$ having, respectively, the weights a, b, c and d, which satisfy the above expressions (1), and d/c is 1 or more; heating the molded product in an atmosphere of nitrogen at 1500° C. or less to thereby convert Si into $Si_3N_4$; and heating the $Si_3N_4$ at 1700° C. or more to render it more fine or minute.

In the aforementioned silicon nitride based sintered product, in the case where Si is converted into $Si_3N_4$, and specific gravities of Si and $Si_3N_4$ are set to 2.33 and 3.21, respectively, the weight becomes 1.38 times. Accordingly, the above-described expression (1) indicates that a rate of the assistant to the total weight of $Si_3N_4$ and the assistant should be in the range of from 6.5 to 12.0 wt. % in order to obtain $Si_3N_4$ of high strength.

EXAMPLE 1

According to one example of a method of producing a silicon nitride based sintered product, a Si powder having a purity of 98.5 wt. % and a mean particle size or mean grain diameter of 15 μm; a $Si_3N_4$ powder having a mean grain diameter of 2 μm; an $Al_2O_3$ powder having a mean grain diameter of 2 μm; and a $Y_2O_3$ powder were weighed so as to satisfy the above-described expression (1) and combined to produce a raw material powder compounded in a low cost manner (for example, about ¥ 1000. per 1 kg). The raw material powder was mixed in a ball mill, a resultant mixture was granulated and then molded into a predetermined shape. After being defatted, the molded product was reacted and calcinated at a temperature of 1500° C. or less under an atmosphere of nitrogen at a pressure of 0.93 MPa so as to convert Si into $Si_3N_4$. Subsequently, the calcinated $Si_3N_4$ was heated to 1700° C. under an atmosphere of nitrogen and subjected to sintering at low pressure to obtain a modified $Si_3N_4$ product. With respect to the thus obtained $Si_3N_4$ product, 4-point bending mean strength and relative density were measured, the results of which are given in Table 1.

TABLE 1

| Sample No. | Raw Material Compound Ratio | | | | 4-point Bending Mean Strength (MPa) | Relative Density (%) |
|---|---|---|---|---|---|---|
| | Si | $Si_3N_4$ | $Al_2O_3$ | $Y_2O_3$ | | |
| 1 | 40 | 50 | 3.7 | 6.3 | 743 | 97.5 |
| 2 | 40 | 50 | 4.5 | 5.5 | 766 | 97.8 |
| 3 | 40 | 50 | 5.5 | 4.5 | 432 | 94.0 |
| 4 | 55 | 40 | 2.5 | 2.5 | 415 | 96.0 |
| 5 | 59.2 | 30.9 | 3.7 | 6.3 | 795 | 98.5 |
| 6 | 65 | 25 | 2.8 | 7.2 | 768 | 99.2 |
| 7 | 65 | 25 | 5.5 | 4.5 | 399 | 96.0 |
| 8 | 70 | 20 | 5 | 5 | 755 | 99.0 |
| 9 | 80 | 15 | 2.5 | 2.5 | 455 | 95.0 |
| 10 | 100 | 0 | 3.7 | 6.3 | 701 | 97.5 |

As will be apparent in Table 1, samples of silicon nitride based sintered products having a relative density of 96% or less exhibit significantly lower strength. It will be apparent also that high strength requires satisfaction of the above expression (1).

Another example of a silicon nitride based sintered product according to the invention consists of at least the elements of Si, N, Al, O and Y, contained in raw materials of Si, $Si_3N_4$, $Al_2O_3$, AlN, and $Y_2O_3$ having, respectively, weights a, b, c, cl and d which satisfy the following expression:

$$6.5 \leq 100(c+cl+d)/(1.38a+b+c+cl+d) \leq 12.0 \quad (2).$$

The product is prepared by sintering a mixed powder including in addition to the above compositions containing the elements of Si, N, Al, O and Y, another element contained in an amount of 1 wt. % or more in the form of oxide thereof.

A method of producing the above silicon nitride based sintered product includes the steps of preparing a molded product from a mixed powder consisting of Si, $Si_3N_4$, $Al_2O_3$, AlN, and $Y_2O_3$ having, respectively, weights a, b, c, cl and d which satisfy the above-described expression (2); heating the molded product in an atmosphere of nitrogen at 1500° C. or less to thereby convert Si into $Si_3N_4$; and then heating the product at 1700° C. or more to render it more fine or minute.

EXAMPLE 2

According to another example of a method of producing a silicon nitride based sintered product, a raw material powder is prepared by combining a Si powder having a purity of 98.5 wt. %; a $Si_3N_4$ powder having a mean grain diameter of 2 μm; an Al$_2$O$_3$ powder having a mean grain diameter of 2 μm; a AlN powder; and a Y$_2$O$_3$ powder all weighed so as to satisfy the above-described expression (2). The raw material powder was compounded in a low cost manner (for example, about ¥ 1000. per 1 kg) and mixed in a ball mill, and the resultant mixture was granulated. Prepared with the granulated material was a molded product having a predetermined shape. After being defatted, the molded product was reacted and calcinated at a temperature of 1500° C. or less under an atmosphere of nitrogen at a pressure of 0.93 MPa to convert the Si into Si$_3$N$_4$. Subsequently, the calcinated Si$_3$N$_4$ was heated up to 1700° C. under an atmosphere of nitrogen and subjected to sintering under low pressure to obtain silicon nitride based sintered product samples. Relative density and 4-point bending mean strength of the product samples then were measured and it was found that satisfactory strength was obtained only when combined compositions of Si, Si$_3$N$_4$, Al$_2$O$_3$, AlN, and Y$_2$O$_3$ satisfied the above-described expression (2). In those cases, it was possible to obtain the Si$_3$N$_4$ product, using as raw material, a low cost Si having a purity of 99 wt % of less.

SECOND EMBODIMENT

Another silicon nitride based sintered product according to the invention is characterized by the use of silicon raw material containing 0.02 wt. % or more of Fe. The product includes the elements Si, N, Al, O, Y, Zn (zinc) and Fe contained in raw material compositions of Si, Si$_3$N$_4$, Al$_2$O$_3$, Y$_2$O$_3$, and oxides of Zn and Fe having, respectively, weights a, b, c, d, e, and f which satisfy the following expressions:

$6 \leq 100 (c + d + e)/(1.67a + b + c + d + e + f) \leq 12.0$
$1 \leq (c + d)/e$
$0.001 \leq 100e/(1.67a + b + c + d + e + f) \leq 7.5$
$0.02 \leq 100f/(1.67a + b + c + d + e + f) \leq 7.5$ ...(3)

The above-described expressions (3) are obtained approximately from data (except B1) shown in Table 2 below. In the aforementioned composition of a silicon nitride based sintered product, at least one element selected out of a group consisting of Ca (calcium), Ni, Cu (copper), Cr (chrome), Co, Mg, Mn, Sn (tin), Ho (holmium), Cd (cadmium), and Pb (lead) may be substituted for the Zn element.

Most of the Fe compound grains contained in the product have diameters of 0.5 μm or less and the Fe compound grains occupy more than 0.1% of an area in a two-dimensional range of 200 μm×200 μm. Also the Fe grains occupy 15% or less of each of 400 area cells (10 μm×10 μm) obtained by equally longitudinally and laterally dividing the 200×200 μm area.

TABLE 2

| Sample No. | Raw Material Compound Ratio | | | | | Bending Strength (MPa) | Relative Porosity (%) |
|---|---|---|---|---|---|---|---|
| | Si | Si$_3$N$_4$ | Al$_2$O$_3$ | Y$_2$O$_3$ | ZnO | | |
| B1 | 59.2 | 30.9 | 3.89 | 6.49 | — | 525 | 0.9 |
| A1 | 59.2 | 30.9 | 3.89 | 6.49 | 1.29 | 845 | 0.11 |
| D1 | 59.2 | 30.9 | 4.30 | 6.00 | 1.29 | 852 | 0.08 |
| D2 | 59.2 | 30.9 | 3.89 | 6.49 | 3.89 | 907 | 0.02 |
| D3 | 59.2 | 30.9 | 4.13 | 6.25 | 3.89 | 897 | 0.13 |
| D4 | 59.2 | 30.9 | 3.89 | 6.49 | 6.49 | 838 | 0.15 |
| D5 | 59.2 | 30.9 | 3.89 | 6.49 | 10.21 | 781 | 0.20 |
| E1 | 70.5 | 13 | 3.89 | 6.49 | 3.89 | 715 | 0.35 |
| E2 | 78 | 39 | 3.89 | 6.49 | 3.89 | 899 | 0.09 |
| E3 | 15.7 | 104 | 3.89 | 6.49 | 3.89 | 775 | 0.19 |

Figure 3:
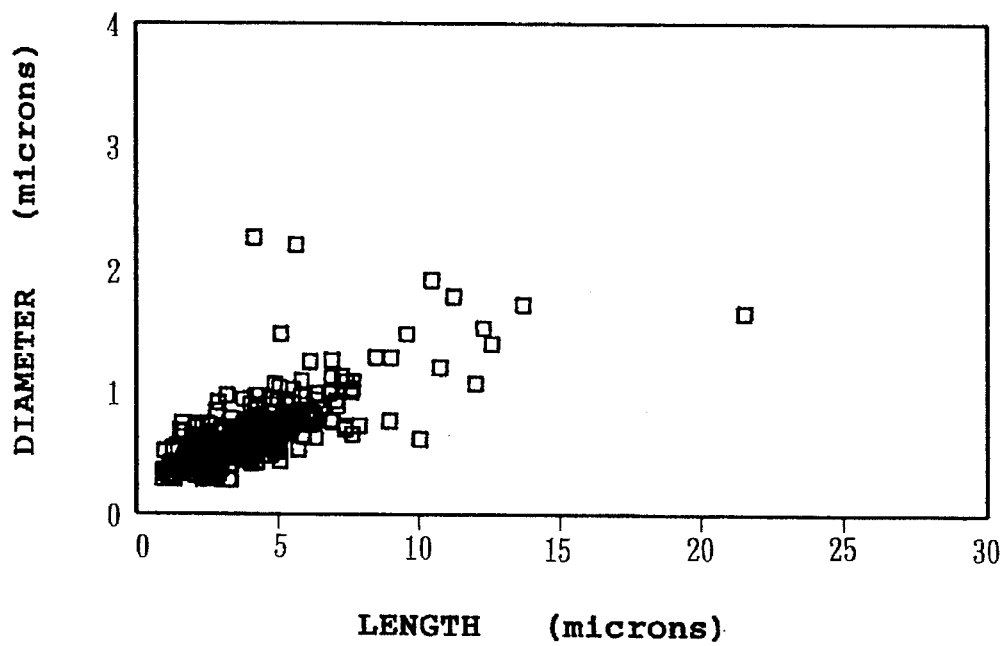
FIG. 3 is a diagram showing physical size of columnar grains of silicon nitride contained in the product.
Figure 4:
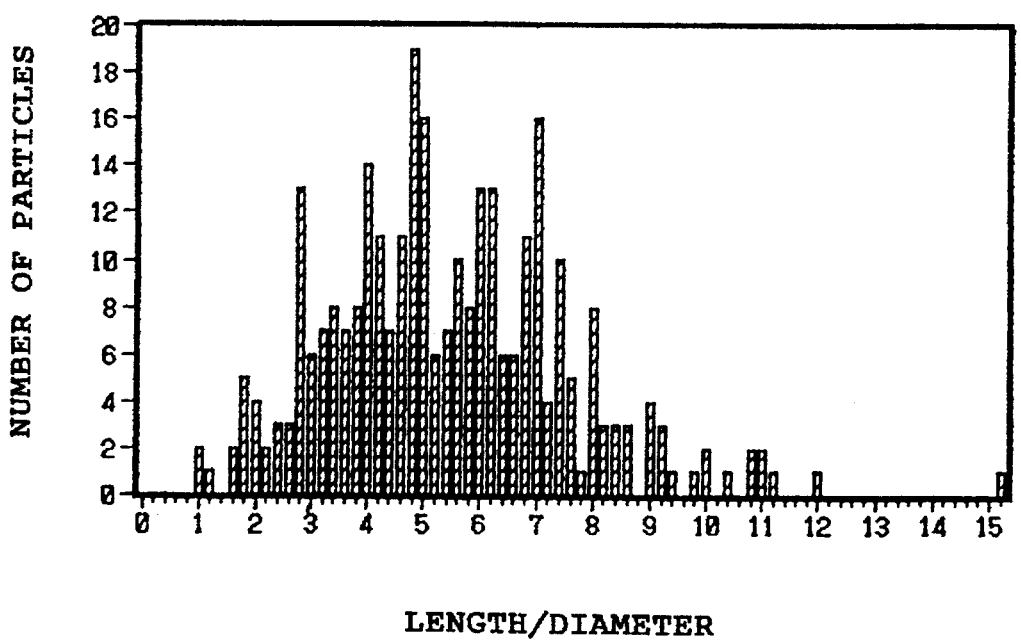
FIG. 4 is a diagram showing characteristics of columnar grains in the silicon nitride in the product.

The product of the invention possesses very fine or minute tissue, a porosity of 0.5% or less, and a mean inside pore diameter of 2 μm or less. Silicon nitride contained in the product is present in the form of columnar grains of which 80% or more have measured diameters between 0.2 and 1.2 μm and lengths of 7.5 μm or less, as shown in FIG. 3. In other words, a ratio or length/diameter of all columnar grains is in the range 1 to 20, and a ratio of length/diameter of about 70% or more of all the columnar grains is in the range 4.5 to 20. More specifically, the ratio of length/diameter of about 50% of the columnar grains is in the range 4.5 to 10, as shown in FIG. 4.

To produce the silicon nitride based sintered product of the invention, a product is molded from powder of compositions or raw materials containing the elements of Si, N, Al, O, Y, Zn and Fe and having a predetermined composition ratio. The molded product is heated at a temperature of 1700° C. or less under an atmosphere containing nitrogen to convert the Si into Si$_3$N$_4$ which is then calcinated at a temperature of 1700° to 2000° C. Containing the elements of Si, N, Al, O, Y, Zn and Fe are the raw materials Si, Si$_3$N$_4$, Al$_2$O$_3$, Y$_2$O$_3$, oxides of Zn and Fe selected to have, respectively, weights a, b, c, d, e and f which satisfy the following expressions:

$6.0 \leq 100 (c + d + e)/(1.67a + b + c + d + e + f) \leq 12.0$
$20 \leq a/(a + b) \leq 90$
$1 \leq (c + d)/e$
$0.5 \leq 100e/(a + b + c + d + e) \leq 7.5$
$0.02 \leq 100f/(1.67a + b + c + d + e + f) \leq 7.5$ ...(3a)

The powder having the respective compositions used to prepare the molded product has a mean grain diameter of 1 μm or less determined by a laser diffraction method and the Si powder constituent includes 0.07 wt. % or more of Fe component as an impurity. One or more elements selected out of a group consisting of Ca, Ni, Cu, Cr, Co, Mg, Mn, Sn, Ho, Cd, and Pb can be substituted for the Zn element.

EXAMPLE 3

A mixture comprising 59.2 parts (about 60 wt. %) of silicon powder having a 0.3 μm mean grain diameter and containing 0.28 wt. % of Fe; 30.9 parts of α phase silicon nitride powder having a 0.3 μm mean grain diameter; 6.49 parts of Y$_2$O$_3$ powder having a 0.1 μm mean grain diameter; 3.89 parts of Al$_2$O$_3$ powder having a 0.7 μm mean grain diameter, and 1.29 parts of ZnO powder having a 1 μm mean grain diameter was placed into a resin-made pot together with methanol, a dispersant and resin balls. The mixture was ball milled for 28 hours to prepare a slurry having a 0.5 μm mean grain diameter. Next, the slurry was dried, crushed and molded by a uniaxial press machine into a plate-like product 10 mm long, 80 mm wide and 5 mm thick. The plate-like product was CIP (cold isostatic press) processed under a pressure of 2000 Kgf/cm$^2$ to prepare a molded product. Thereafter, the molded product was first calcinated for 10 hours at a temperature of 1400° C. under an atmosphere of nitrogen and pressure of 9.5 kgf/cm$^2$ and then calcinated for 5 hours at a temperature of 1900° C. to obtain a silicon nitride based sintered product A1 (shown as an example of a typical composition ratio in Table 2).

As a Comparative Example, different raw materials excluding ZnO were used for molded products and sintered in a method similar to Example 3 to prepare a number of sintered products shown as a typical example B1 in Table 2. The silicon nitride based sintered product A1 according to the present invention and the sintered product B1 according to the Comparative Example were examined to determine anti-bending strength by 4-point bending (JIS R1601). It was found that the bending strength of the silicon nitride based sintered product A1 according to the present invention was superior to that of the sintered product B1 according to the Comparative Example. Also, as shown in FIG. 1, for silicon nitride based sintered products containing Fe in amounts less than about 0.08 wt %, the bending strength of the product is reduced to one half, whereas products in which the amount of Fe contained is about 0.08 wt % or more, preferably, in excess of 0.1 wt %, possess excellent bending strength of about 1000 MPa.

Figure 2:
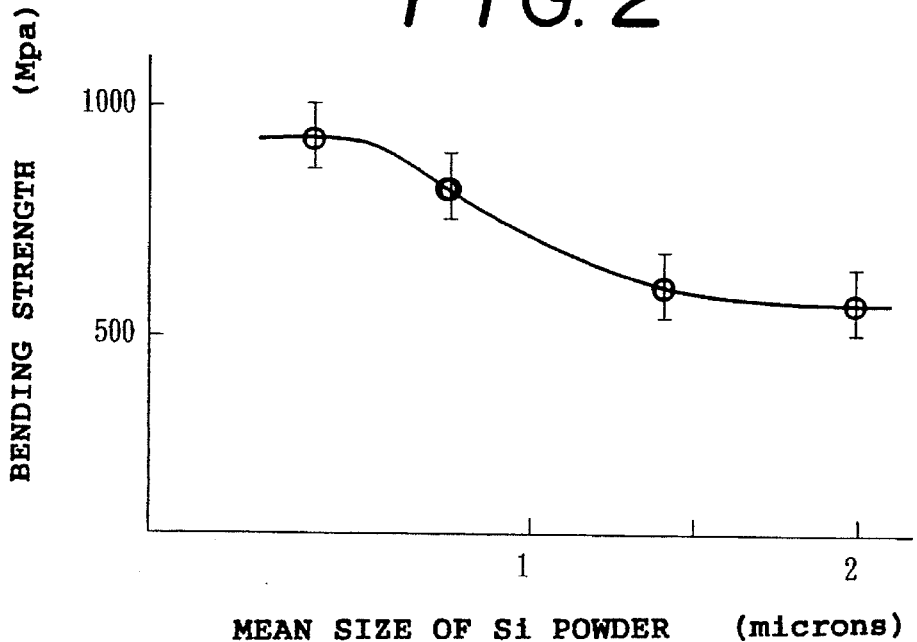
FIG. 2 is a diagram showing a relationship between the grain size of Si raw material powder and bending strength of the product.

In other tests, raw materials of silicon powder containing 0.28(±0.02) wt % of Fe and different mean grain diameters were used, to obtain a number of sintered products CO prepared similarly from molded products having a composition ratio the same as that of the sintered product A1 of Example 3. The bending strength of the CO products was measured and plotted in FIG. 2. As shown, for products prepared with silicon powder containing 0.28(±0.02) wt % of Fe and a mean grain diameter less than about 1 μm, a high bending strength was obtained, whereas for products prepared with silicon powder containing 0.28(±0.02) wt % of Fe and a mean grain diameter exceeding about 1 μm, a significant reduction in the bending strength was found.

In addition, other products were prepared with raw materials different in a mixing ratio between silicon and silicon nitride and in amounts of $Y_2O_3$, $Al_2O_3$ and ZnO additive. The resulting sintered products D1 to D5 and E1 to E3 (Table 2) were prepared with compositions similar to that of Example 3 and in a manner similar to that described above. As shown in Table 2, the bending strength of the sintered products D1 to D5 and E1 to E3 was greatly affected by the amount of ZnO additive. Amounts of ZnO additive less than 0.01 wt % or above 0.06 wt %, produced generally unsatisfactory results.

THIRD EMBODIMENT

Another silicon nitride based sintered product according to the present invention is characterized by using a silicon raw material containing 0.005 to 15 wt % of Fe component. The product contains elements Si, N, Al, O, Y and Fe, contained in raw materials $Si_3N_4$, AlN, $Y_2O_3$ and Fe having, respectively, weights b, cl, d and f which satisfy the following expressions.

$$5 \leq 100 (cl + d + f)/(b + cl + d + f) \leq 15$$
$$1 \leq (cl + d)/f$$
$$0.005 \leq 100f/(b + cl + d + f) \leq 7.5$$
$$1 \leq d/cl \leq 15 \quad \ldots (4)$$

The aforementioned expressions (4) were obtained approximately from the product test samples shown in Table 3 below.

TABLE 3

| Sample No. | Raw Material Compound Weight | | | | $Y_2O_3$/ AlN | Bending Strength (Mpa) |
|---|---|---|---|---|---|---|
| | Si | $Si_3N_4$ | AlN | $Y_2O_3$ | | |
| 1 | 40.0 | 20.88 | 7.85 | 7.80 | 0.99 | 526 |
| 2 | 40.0 | 20.88 | 4.90 | 4.87 | 0.99 | 635 |
| 3 | 40.0 | 20.88 | 3.30 | 6.50 | 1.97 | 911 |
| 4 | 40.0 | 20.88 | 2.00 | 7.80 | 3.90 | 918 |
| 5 | 40.0 | 20.88 | 1.10 | 8.70 | 7.91 | 857 |
| 6 | 40.0 | 20.88 | 0.60 | 9.20 | 15.3 | 653 |
| 7 | 51.4 | 9.48 | 2.00 | 7.80 | 3.90 | 715 |

In each sample, more than 80% of the compound grains of the Fe component had a diameter between 0.2 to 4 μm.

More specifically, Fe compound grains having 0.2 μm or more of grain diameter occupied 0.01 to 12% of an area in the two-dimensional range of 200 μm×200 μm and less than 35% of each of 400 area cells (10 μm×10 μm unit) obtained by equally longitudinally and laterally dividing the area of 200 μm×200 μm.

The silicon nitride based sintered product of the invention constitutes extremely fine or minute tissue. The porosity of the product is 0.5% or less, and a mean diameter of the pores is 2 um or less. Silicon nitride contained in the product is present as columnar grains having the characteristics in FIGS. 3 and 4 which show that 80% of the columnar grains have a diameter between 0.2 and 1.2 μm, a length of 7.5 μm or less and a ratio of length/diameter between 1 and 20. In addition, 50% of the columnar grains have a ratio of length/diameter of between 4.5 and 20.

In order to produce a silicon nitride based sintered product having fine or minute tissue, raw materials containing the elements Si, N, Al, O, Y and Fe are molded from powder at a predetermined ratio of composition. The molded product is heated at a temperature of 1200° to 1400° C. under an atmosphere containing nitrogen to convert the Si into $Si_3N_4$, which then is calcinated at a temperature of 1700° to 2000° C. The composition ratio of the elements Si, N, Al, O, Y and Fe is predetermined so as to fulfill the aforementioned expressions (4) with raw materials $Si_3N_4$, AlN, $Y_2O_3$ and Fe having, respectively, the weights b, cl, d and f.

EXAMPLE 4

Raw material powders of Si containing 0.36 wt % of Fe component, $Si_3N_4$, AlN and $Y_2O_3$ were mixed at a weight composition ratio shown in Table 3 above. The mixture was put into a resin-made pot together with a dispersant and resin balls and ball milled for 48 hours to prepare a slurry. Thereafter, the slurry was dried, crushed and molded by a uniaxial press machine into a plate-like product 10 mm long, 80 mm of width and 8 mm thick. The plate-like product was subjected to cold isostatic press (CIP) or cold hydrostatic press under a pressure of 2000 kgf/cm² to prepare a molded product. Next, the molded product was first calcinated for 10 hours at a temperature of 1400° C. under an atmosphere of nitrogen at a pressure of 9.5 kgf/cm2 and then calcinated for 5 hours at a temperature of 1900° C. to obtain a silicon nitride based sintered product which was subjected to a 4-point bending strength test in accordance with JIS R1601.

Table 3 above shows the composition of raw material powder used for silicon nitride based sintered product (Samples No. 2 to No. 6) according to the present invention and the results of 4-point bending strength tests for those products. In Table 3, Samples 1 and 7 are shown as Comparative Examples. Table 4 (below) shows the quantitative results of grain boundary phase, for the silicon nitride based sintered product samples in Table 3, using a transmission type electronic microscope (TEN) and an energy dispersion type wave length spectroscope (EDS).

TABLE 4

| Sample no. | Si (wt %) | Al (wt %) | O (wt %) | Y (wt %) | N & Others (wt %) |
|---|---|---|---|---|---|
| 2 | 59.7 | 3.6 | 3.1 | 26.3 | 7.3 |
| 3 | 41.1 | 8.6 | 32.6 | 16.9 | 0.8 |
| 4 | 53.0 | 2.0 | 19.0 | 24.0 | 2.0 |
| 5 | 11.2 | 3.8 | 35.1 | 47.9 | 2.0 |
| 6 | 50.0 | 2.2 | 3.7 | 36.2 | 7.9 |

With respect to the silicon nitride based sintered product sample No. 4 in Table 3, a grain boundary phase was eluted within a fluorine solution, the remaining columnar grains were removed, the columnar grains were photographed by a scanning type electronic microscope (SEM), and diameters and lengths of the columnar grains were measured, the results obtained from the procedure were similar to those shown in FIG. 3.

Figure 5:
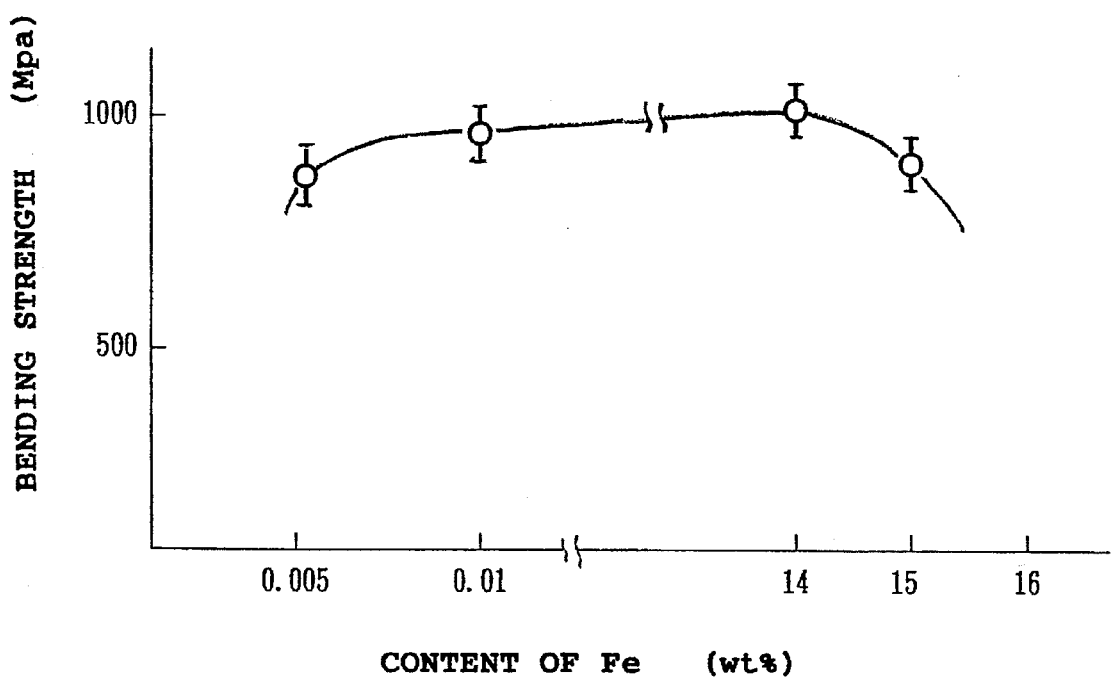
FIG. 5 is a diagram showing the relationship between Fe component additive and bending strength of the product.
Figure 6:
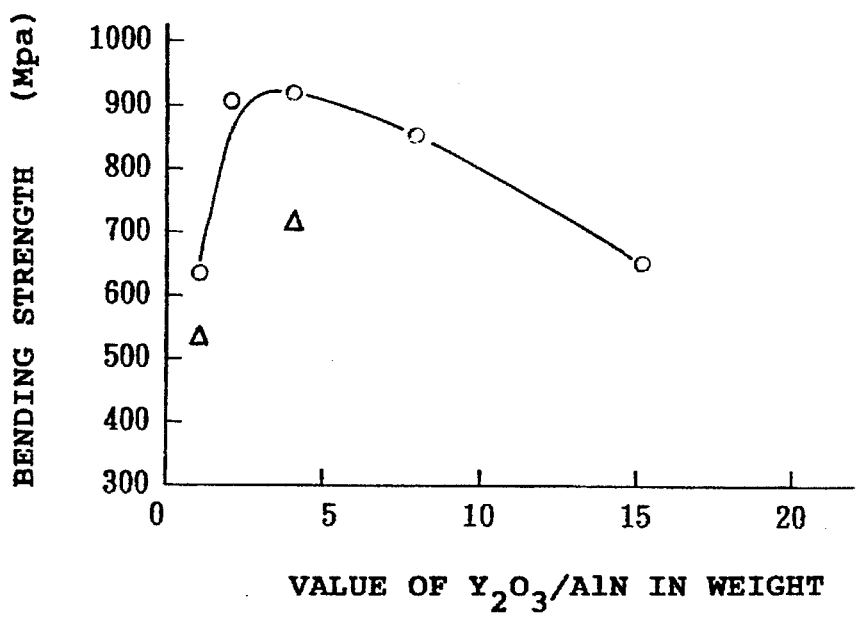
FIG. 6 is a diagram showing the relationship between weight of $Y_2O_3$/AlN raw materials and bending strength for product according to both the invention and Comparative Examples.

FIG. 5 shows the changes in 4-point being strength resulting from changes of silicon purity produced by adjustments in Fe additive to Sample No. 2 in Table 3 having the composition of $(1.67\ Si+Si_3N_4): Al_2O_3: Y_2O_3=90:5:5$. FIG. 6 shows the relationship between weight of $Y_2O_3/AlN$ content and 4-point bending strength with respect to the invention Samples No. 2 to No. 6 and the Comparative Example Samples No. 1 and No. 7 in Table 3.

As shown in FIG. 5, it has been found that the bending strength of the silicon nitride based sintered product according to the present invention was about 1000 MPa, which was significantly above the bending strength of the Comparative Example product Samples No. 1 and No. 7 in Table 3. The bending strength of the product decreases materially when the amount of Fe content in the raw material is less than about 0.005 wt %, or greater than about 15%.

Obviously, many modifications and variations of the present invention are possible in light of the above teachings. It is to be understood, therefore, that the invention can be practiced otherwise than as specifically described.

What is claimed is:

1. A silicon nitride based sintered product containing 0.005 to 15 wt % of Fe, characterized in that Fe compound grains having a grain size of at least 0.2 μm occupy 0.1 to 15% of the area of a two-dimensional 200×200 μm area in said product, and said Fe compound grains occupy less than 35% of the area of each of 400 10 μm×10 μm cell areas obtained by equally longitudinally and laterally dividing said 200×200 μm area.

2. The silicon nitride based sintered product of claim 1, wherein more than 80% of the total number of said Fe compound grains have a grain size of 0.2 to 4 μm; and said Fe compound grains occupy 0.1 to 12% of the area of said 200×200 μm area.

3. The silicon nitride based sintered product of claim 1, wherein the porosity of said product is 0.5% or less, and a mean inside diameter of the pores is 2 μm or less.

4. The silicon nitride based sintered product of claim 1, wherein said product contains columnar grains of silicon nitride and at least 80% of all said columnar grains have diameters of 0.2 to 1.2 μm.

5. The silicon nitride based sintered product of one of claims 1 to 4, wherein said product comprises the elements of Si, N, Al, O, Y, Zn and Fe contained in raw materials, of Si, $Si_3N_4$, $Al_2O_3$, $Y_2O_3$ and oxides of Zn and Fe; having weights of a, b, c, d, e and f, respectively; and the following expressions are satisfied:

$6 \leq 100(c + d + e)/(1.67a + b + c + d + e + f) \leq 12.0$
$1 \leq (c + d)/e$
$0.001 \leq 100e/(1.67a + b + c + d + e + f) \leq 7.5$
$0.02 \leq 100f/(1.67a + b + c + d + e + f) \leq 7.5$.

6. The silicon nitride based sintered product of one of claims 1–4, wherein said product comprises the elements Si, N, Al, O, Y, Fe and one element selected out of a group consisting of Ca, Ni, Cu, Cr, Co, Mg, Mn, Sn, Ho, Cd, and Pb; said elements being contained in raw materials of Si, $Si_3N_4$, $Al_2O_3$, $Y_2O_3$ and oxides of Fe and said one element, said materials having weights of a, b, c, d, f, and e, respectively; and the following expressions are satisfied:

$6 \leq 100(c + d + e)/(1.67a + b + c + d + e + f) \leq 12.0$
$1 \leq (c + d)/e$
$0.001 \leq 100e/(1.67a + b + c + d + e + f) \leq 7.5$
$0.02 \leq 100f/(1.67a + b + c + d + e + f) \leq 7.5$.

7. The silicon nitride based sintered product of one of claims 1 to 4, wherein said product comprises the elements of Si, N, Al, O, Y and Fe, contained in raw materials of $Si_3N_4$, AlN, $Y_2O_3$ and Fe having weights of b, c1, d and f, respectively; and the following expressions are satisfied:

$5 \leq 100(c1 + d + f)/(b + c1 + d + f) \leq 15$
$1 \leq (c1 + d)/f$
$0.005 \leq 100f/(b + c1 + d + f) \leq 7.5$
$1 \leq d/c1 \leq 15$.

8. The silicon nitride based sintered product of claim 7, wherein in more than 80% of measured values of quantitative analysis of grain boundary phases of said product, a composition amount ratio of Si/Al is 1 to 30, a composition amount ratio of Si/Y is 0.1 to 3, a composition amount ratio of Si/O is 0.1 to 20 and composition amount ratio of Y/Al is 0.5 to 20; and values of (Si amount/Al amount), (Si amount/Y amount), (Si amount/O amount), and (Y amount/Al amount) are respectively fulfilled with mean value× $0.8 \leq$ (maximum value−minimum value).

* * * * *